S. SPOOR.
Assignor to W. M. Spoor, H. M. Russell, S E. Norton, and Foxell & Jones.
COOKING UTENSILS.
No. 7,602. Reissued April 10, 1877.
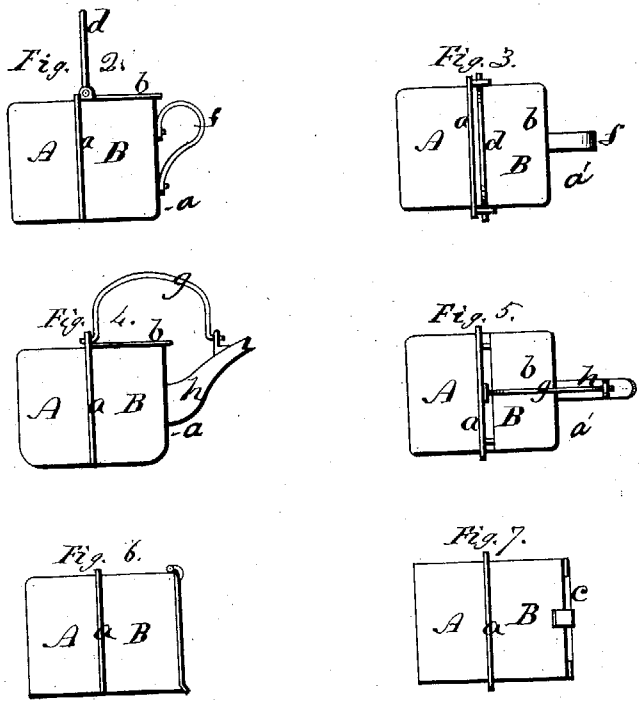
WITNESSES
Geo. W. Browne
E. McGallaher
By
INVENTOR,
Stephen Spoor,
J. S. Brown, his Attorney.
N. PETERS. PHOTO-LITHOGRAPHER, WASHINGTON, D. C.

UNITED STATES PATENT OFFICE.

STEPHEN SPOOR, OF TROY, NEW YORK, ASSIGNOR TO WILLIAM M. SPOOR, HELEN M. RUSSELL, SAMUEL E. NORTON, AND FOXELL & JONES.

IMPROVEMENT IN COOKING-UTENSILS.

Specification forming part of Letters Patent No. 86,108, dated January 19, 1869; reissue No. 7,602, dated April 10, 1877; application filed February 29, 1876.

*To all whom it may concern:*

Be it known that I, STEPHEN SPOOR, of Troy, in the county of Rensselaer and State of New York, have invented an Improved Construction of Cooking-Utensils; and I do hereby declare that the following is a full and exact description thereof, reference being had to the accompanying drawings, making part of this specification—

Figure 1 being a representation of a heating-stove, showing the method of using my improved cooking-utensils in the special adaptation; Figs. 2, 3, and 4, and 5, 6, and 7, respectively, side and top views of a boiler, tea-kettle and an oven, constructed in my improved manner.

Like letters designate corresponding parts in all of the figures.

The leading purpose of my invention is to produce a set of cooking-utensils which can be inserted in openings in the vertical or upright sides of stoves, and be self-balancing or self-supporting therein. They are intended particularly to be applied to heating-stoves, and to be inserted in door, window, or other openings in the sides thereof. They are especially applicable to, and useful for, magazine-stoves, such as have illuminating-doors or mica windows, the frames of which swing away, and leave openings into the combustion-chamber thereof.

The cooking-utensils, in order to be admitted in such openings, have one portion, A, thereof of a size to nearly fill the same, and of a shape to properly fit therein, and this portion comprises a sufficient proportion of the whole vessel to rest supported in the openings, either by overbalancing the portion B, which remains outside of the stove, or, if it does not overbalance the outside portion, by fitting sufficiently close therein, and having enough depth from front to rear to bind in the openings by tipping slightly, and thus be supported. Generally, in the magazine-stoves now in use, the faces around the window-openings are inclined inward a little from bottom to top, so that the utensils rest against the sides all the more securely.

The utensils, when inserted, rest on the lower edges or ledges of the openings; or when the doors or window-frames turn downward into a horizontal position, as shown in Fig. 1, they may rest partly thereon.

As the form of these openings is generally rectangular, or nearly so, the portion A of each utensil approximates to that form, or to whatever form the openings may have; but the corners generally may be rounded slightly.

The form of the front side *a'*, or a portion of the front side of the utensils which are to hold water or other liquids, such as the boiler or kettle, Figs. 2 and 3, and the tea-kettle, Figs. 4 and 5, is flat or plane, this form being specially useful in pouring out the water or liquid therefrom, when resting or bearing the same against a support or some edge or surface, on which they are tilted, thereby steadying the utensils, and preventing their turning sidewise and wrenching the hands, or rendering the utensils hard to hold. This form is of general utility for such vessels. For convenience and uniformity, the oven, Figs. 6 and 7, may be similar in general form to the kettles.

Between the portions A and B is a flange or shoulder, *a*, to bear against the side of the stove, fix the position of the utensil, and cover the joints around it.

The portion A, including one-half, or thereabout, of the whole utensil, being inserted within the stove, is subjected to the immediate action of the heat in the fire-pot or combustion-chamber, so that the viands are cooked or the liquids heated rapidly therein.

There are, or may be, vent-holes in the top of the portion A, for the steam to escape through into the stove from the boilers or tea-kettles, and for vapors and smoke to escape through into the stove from the oven, boiler, or griddle.

The lid *b* of the boiler or tea-kettle, Figs. 2, 3, 4, and 5, may be on the outside portion B, but might be on the inserted portion A. For the oven, Figs. 6 and 7, broiler, or griddle, a door, *c*, in front is most convenient.

The handle or bail *d* of the boiler, Figs. 2 and 3, is hinged to the projecting portion B, so located as to suspend it centrally, as nearly as possible. It may have a handle, *f*, in front, instead of, or in addition to, the bail *d*.

The handle or bail *g* of the tea-kettle may be hinged at one end to the top of the portion B, as near as possible to the shoulder or flange *a*, and at the other end to an ear on the spout *h*.

I am aware that boilers have been so constructed and arranged as to derive their heat through the side or rear plates of a stove; but in such cases the boiler has been supported by legs, or by other means than the opening in, or some projection on, the side of the stove. Therefore I do not claim, broadly, such an arrangement of a boiler; but

What I claim as my invention, and desire to secure by Letters Patent, is—

1. A cooking-utensil constructed and arranged substantially as represented and described, to fit in a door or window opening in a vertical or upright side of a heating-stove, and to partially project into the interior of the stove, so as to be self sustained or supported therein, for the purposes herein specified.

2. Cooking-utensils constructed and arranged substantially as represented and described, to project through the side of a stove into the interior thereof, and be subjected to the immediate heat of the fire in the combustion-chamber, substantially as and for the purpose herein specified.

3. In cooking-utensils, kettles, or boilers, a resting-face, *a'*, constructed substantially as shown and described, in combination with the spout *h*, or equivalent projection, on the upper part of the said resting-face, for the purpose herein specified.

4. A cooking-utensil having a pit or stove-entering portion, A, at one side, substantially as shown and described, and for the purpose herein specified.

5. A cooking-utensil having a flange, *a*, between the inner part or pit A and the outer part or body B, formed to fit the edge of the stove-opening which receives it, substantially as shown and described, and for the purpose specified.

6. A tea-kettle having a bail, *g*, hung at one end to the body thereof, and at the other end to the spout *h*, substantially as shown and described, and for the purpose herein specified.

Specification signed by me this 4th day of December, 1875.

STEPHEN SPOOR.

Witnesses:
L. M. RUSSELL,
HEZEKIAH JONES.